(12) United States Patent
Kester

(10) Patent No.: US 10,120,202 B2
(45) Date of Patent: Nov. 6, 2018

(54) PATTERNED ARTICLES AND METHODS FOR COATING SUBSTRATES WITH A PATTERNED LAYER

(71) Applicant: QUANTUM INNOVATIONS, INC., Central Point, OR (US)

(72) Inventor: Norman L. Kester, Rogue River, OR (US)

(73) Assignee: QUANTUM INNOVATIONS, INC., Central Point, OR (US)

(*) Notice: Subject to any disclaimer, the term of this patent is extended or adjusted under 35 U.S.C. 154(b) by 53 days.

(21) Appl. No.: 14/804,503

(22) Filed: Jul. 21, 2015

(65) Prior Publication Data

US 2016/0026000 A1    Jan. 28, 2016

Related U.S. Application Data

(60) Provisional application No. 62/028,035, filed on Jul. 23, 2014.

(51) Int. Cl.
| | |
|---|---|
| G02C 7/10 | (2006.01) |
| G02C 7/00 | (2006.01) |
| G02C 3/00 | (2006.01) |
| G02C 7/02 | (2006.01) |
| G02B 1/10 | (2015.01) |

(52) U.S. Cl.
CPC ............ G02C 7/021 (2013.01); G02B 1/10 (2013.01); *G02C 2202/16* (2013.01)

(58) Field of Classification Search
CPC ........ G02C 7/021; G02C 7/046; G02C 7/105; G02C 2202/16; G02B 1/10; B29D 11/00923

USPC .............. 351/159.69, 159.8, 159.66, 159.28, 351/159.81
See application file for complete search history.

(56) References Cited

U.S. PATENT DOCUMENTS

| | | | | |
|---|---|---|---|---|
| 4,673,609 A | * | 6/1987 | Hill | ................... B32B 17/10247 219/203 |
| 4,715,702 A | * | 12/1987 | Dillon | .................... G02C 11/02 351/159.63 |
| 4,812,031 A | | 3/1989 | Evans | |
| 4,934,792 A | * | 6/1990 | Tovi | ......................... G02B 1/10 351/159.62 |
| 4,955,709 A | | 9/1990 | Smith | |
| 4,989,967 A | * | 2/1991 | Matsuda | .................. G02C 7/12 351/159.63 |
| 5,521,655 A | | 5/1996 | Rhoad | |

(Continued)

FOREIGN PATENT DOCUMENTS

| | | |
|---|---|---|
| EP | 0677764 | 10/1995 |
| EP | 2682808 | 1/2014 |
| WO | WO2013121763 | 8/2013 |

*Primary Examiner* — Collin X Beatty
(74) *Attorney, Agent, or Firm* — Jerry Haynes Law

(57) ABSTRACT

Patterned articles include a substantially transparent substrate having at least one optical property, the substrate further having an outer surface and an inner surface; and at least one patterned layer on the outer surface of the substrate, the at least one patterned layer visible on the outer surface and having at least one optical property substantially matching the at least one optical property of the substrate, whereby visibility of the at least one patterned layer is at least partially restricted through the inner surface. Methods of forming a patterned article are also disclosed.

20 Claims, 8 Drawing Sheets

(56) References Cited

U.S. PATENT DOCUMENTS

| | | | |
|---|---|---|---|
| 5,525,177 A * | 6/1996 | Ross | B44C 1/1716 |
| | | | 156/230 |
| 5,731,898 A | 3/1998 | Orzi et al. | |
| 5,767,933 A * | 6/1998 | Hagan | G02C 7/16 |
| | | | 351/44 |
| 6,020,983 A | 2/2000 | Neu et al. | |
| 6,145,984 A * | 11/2000 | Farwig | G02C 7/104 |
| | | | 351/159.56 |
| 6,231,183 B1 | 5/2001 | Dillon | |
| 6,254,711 B1 * | 7/2001 | Bull | B44C 1/1716 |
| | | | 156/234 |
| 6,719,928 B2 | 4/2004 | Dillon | |
| 6,793,339 B1 * | 9/2004 | Yip | G02B 1/105 |
| | | | 351/159.62 |
| 7,719,761 B2 * | 5/2010 | Lau | G01S 3/781 |
| | | | 359/399 |
| 7,939,127 B2 | 5/2011 | Conte et al. | |
| 7,955,642 B2 | 6/2011 | Hsu | |
| 2002/0018177 A1 | 2/2002 | Dillon | |
| 2010/0102025 A1 | 4/2010 | Eagerton | |
| 2013/0155523 A1 | 6/2013 | Wu | |
| 2014/0055743 A1 * | 2/2014 | Okubo | G02B 1/115 |
| | | | 351/159.69 |
| 2014/0300856 A1 * | 10/2014 | Dangelmaier | G02C 7/021 |
| | | | 351/159.42 |

\* cited by examiner

PATTERNED ARTICLES AND METHODS FOR COATING SUBSTRATES WITH A PATTERNED LAYER

CROSS-REFERENCE TO RELATED APPLICATIONS

This application claims the benefit of U.S. provisional application 62/028,035, filed Jul. 23, 2014 and entitled "PATTERNED ARTICLE AND METHOD FOR COATING A SUBSTRATE WITH A PATTERN", which provisional application is hereby incorporated by reference herein in its entirety.

FIELD OF THE INVENTION

The disclosure generally relates to patterned articles and methods of forming patterned articles by coating substrates with at least one patterned layer. More particularly, the disclosure relates to patterned articles and methods of forming patterned articles by coating an outer surface of a substrate with at least one patterned layer which is visible on the outer surface and not visible on an inner surface of the substrate.

SUMMARY OF THE INVENTION

The disclosure is generally directed to patterned articles including a substantially transparent substrate having at least one optical property, the substrate further having an outer surface and an inner surface; and at least one patterned layer on the outer surface of the substrate, the at least one patterned layer visible on the outer surface and having at least one optical property substantially matching the at least one optical property of the substrate, whereby visibility of the at least one patterned layer is at least partially restricted through the inner surface.

The disclosure is further generally directed to methods of forming a patterned article including at least partially matching at least one optical property of at least one patterned coating material with at least one optical property of a substantially transparent substrate having an outer surface and an inner surface and forming at least one patterned layer on the outer surface of the substrate by depositing the at least one patterned coating material on the outer surface, whereby visibility of the at least one patterned layer is at least partially restricted through the inner surface.

BRIEF DESCRIPTION OF THE DRAWINGS

The disclosure will now be made, by way of example, with reference to the accompanying drawings, in which.

Like reference numerals refer to like parts throughout the various views of the drawings.

DETAILED DESCRIPTION

Figure 1A:
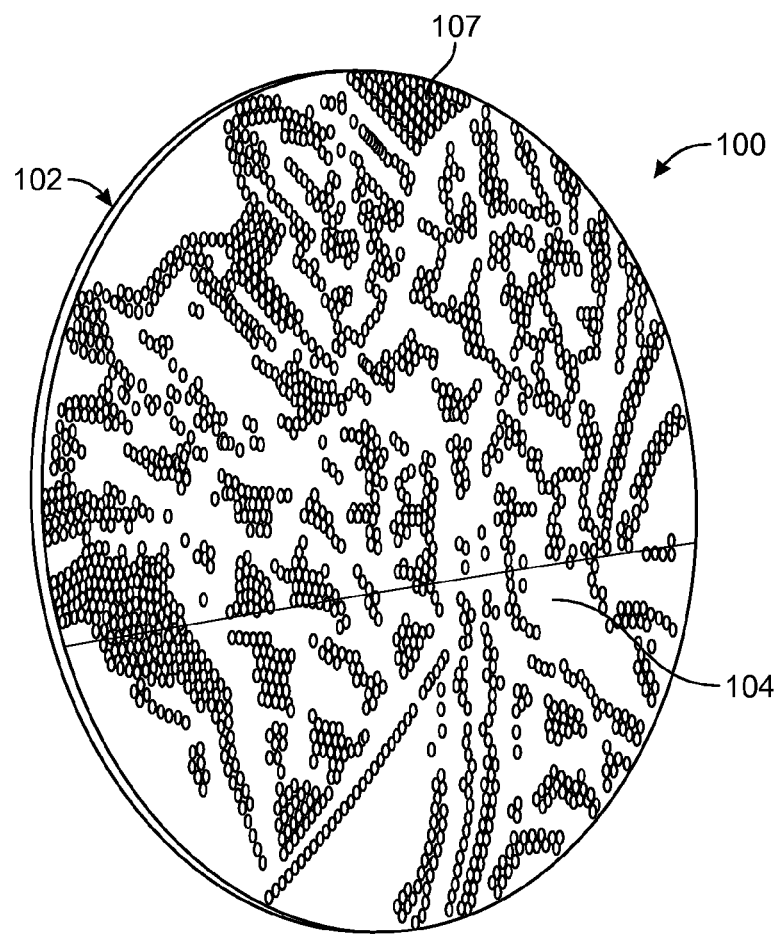
FIG. 1A is a detailed perspective view of a patterned article including a substrate with an exemplary patterned layer on an outer surface of the substrate in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Referring to the drawings, the present disclosure is generally directed to patterned articles 100 (FIGS. 1A-1C) and methods 400 (FIG. 4) for coating an outer surface 104 of a substrate 102 with at least one patterned layer 107 in fabrication of the patterned article 100. The at least one patterned layer 107 forms a pattern that is visible on the outer surface 104 but not visible on an inner surface 108 of the substrate 102. In this manner, eclectic patterns may be coated on the outer surface 104 without obstructing the view through the patterned article 100 from the vantage point of the inner surface 108 and without affecting the intrinsic optical properties of the patterned article 100. In fabrication of the patterned article 100, a patterned coating material 106 is selected, configured and coated onto the substrate 102 to form at least one patterned layer 107 which substantially matches at least one optical property 110 (FIG. 3A) of the substrate 102 and/or at least one optical property 110 of an optical coating (not illustrated) on the substrate 102. The at least one optical property 110 may include such optical properties as light reflection, refraction, absorption, refractive index, tinting, photochromatic properties, light scattering properties and/or the like, and is taken into consideration when selecting and configuring the patterned coating material 106 which will form the patterned layer 107 on the substrate 102. In this manner, the patterned layer 107 is visible to an observer who views the outer surface 104 and not visible to an observer who views the inner surface 108 of the patterned article 100.

In some embodiments, a patterned article 100 coated with at least one patterned layer 107 (FIG. 1E) may include:
a substrate 102 having at least one optical property 110 (FIG. 3A) and/or at least one optical coating (not illustrated), the substrate 102 at least partially transparent to enable at least partial visibility through the substrate 102;
the substrate 102 further including an outer surface 104, the outer surface 104 having at least one patterned layer 107,
wherein the at least one patterned layer 107 is visible on the outer surface 104, the substrate 102 further including an inner surface 108,
wherein visibility of the at least one patterned layer 107 through the inner surface 108 is at least partially restricted.

In some embodiments, a method of fabricating a patterned article 100 by depositing at least a first patterned coating layer 107 (FIG. 1E) on a substrate 102 may include:
at least partially matching at least one optical property 110 (FIG. 3A) of at least one patterned coating material 106 with at least one optical property 110 of a substrate 102 having an outer surface 104 and an inner surface 108; and
forming at least one patterned layer 107 by depositing the at least one patterned coating material 106 on the outer surface 104 of the substrate 102, whereby visibility of the at least one patterned layer 107 through the inner surface 108 of the substrate 102 is at least partially restricted.

In some embodiments, a method of fabricating a patterned article 100 by depositing at least a first patterned coating layer 107 and a second patterned coating layer 113 (FIG. 1F) on a substrate 102 may include:
at least partially matching at least one optical property 110 (FIG. 3A) of a first patterned coating material 106 with at least one optical property 110 of a substrate 102 having an outer surface 104 and an inner surface 108;
forming a first patterned layer 107 by depositing the first patterned coating material 106 on the outer surface 104 of the substrate 102;
at least partially matching at least one optical property 110 (FIG. 3A) of a second patterned coating material 112 with at least one optical property 110 of the substrate 102; and
forming a second patterned layer 113 by depositing the second patterned coating material 112 on the first patterned layer 107, whereby visibility of the first patterned layer 107 and the second patterned layer 113 through the inner surface 108 of the substrate 102 is at least partially restricted.

Figure 1B:
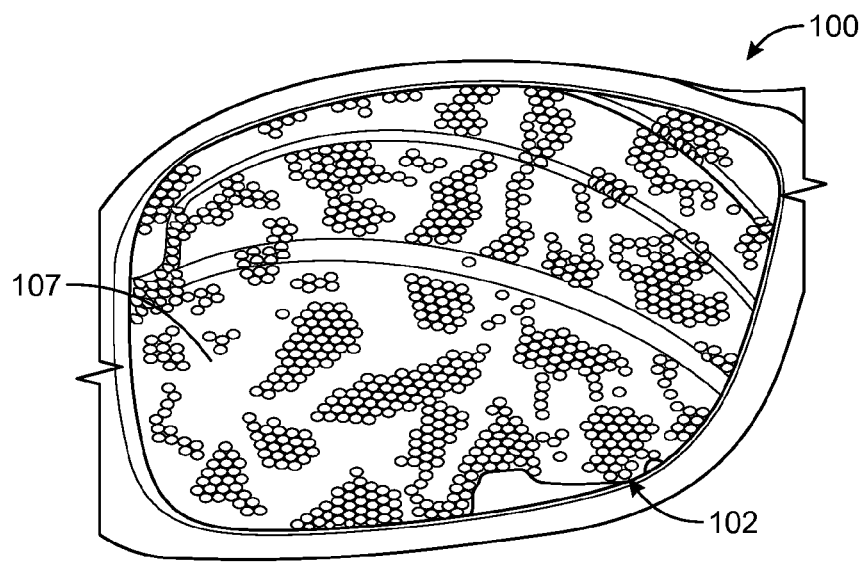
FIG. 1B is a detailed perspective view of a patterned article with an alternative exemplary patterned layer on an outer surface of a substrate in accordance with an illustrative embodiment of the present invention.
Figure 1C:
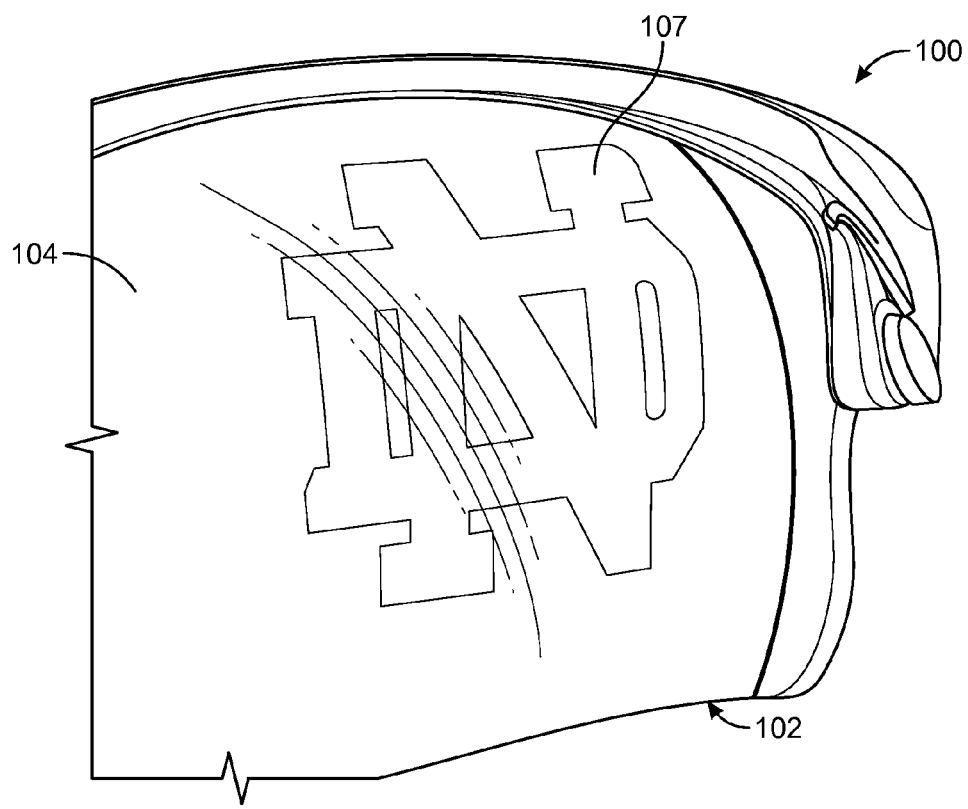
FIG. 1C is a detailed perspective view of a patterned article with another alternative exemplary patterned layer on an outer surface of the substrate in accordance with an illustrative embodiment of the present invention.
Figure 1D:
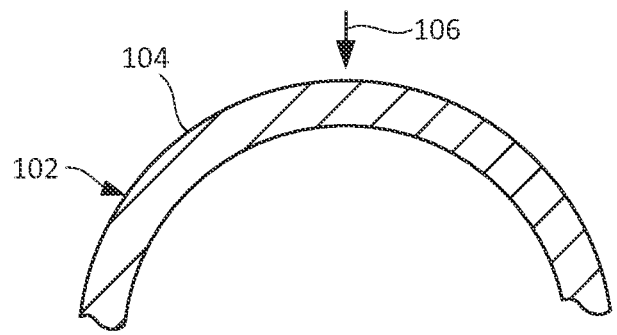
FIG. 1D is a cross-sectional view of a section of a substrate, illustrating application of a first patterned coating material to form a first patterned layer on an outer surface of the substrate in fabrication of a patterned article in accordance with an illustrative embodiment of the present invention.
Figure 1E:
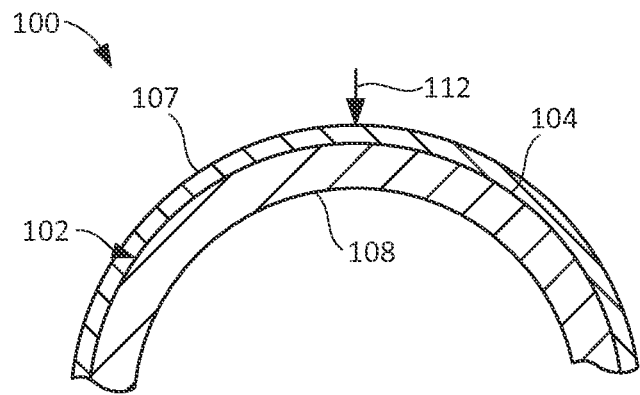
FIG. 1E is a cross-sectional view of the section of the substrate illustrated in FIG. 1D, illustrating application of a second patterned coating material to form a second patterned layer on the first patterned layer in fabrication of the patterned article in accordance with an illustrative embodiment of the present invention.
Figure 1F:
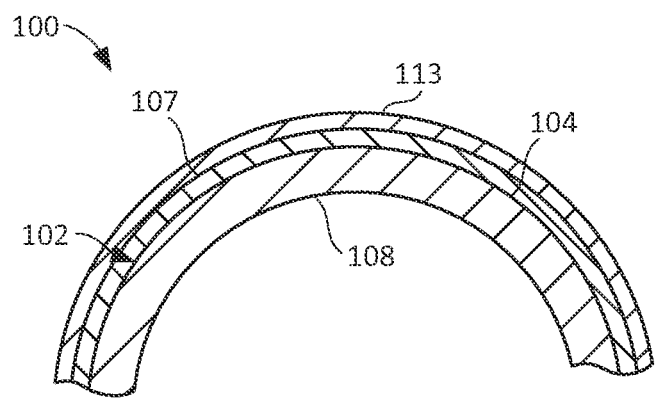
FIG. 1F is a cross-sectional view of the section of the substrate illustrated in FIG. 1E, with the second patterned layer on the first patterned layer in the fabricated patterned article in accordance with an illustrative embodiment of the present invention.

As illustrated in FIGS. 1A, 1B and 1C, the patterned article 100 may include a substrate 102 having an outer surface 104 and an inner surface 108. In some embodiments, the substrate 102 may include a lens for sunglasses, wherein the lens has a generally concave inner surface 108 and a generally convex outer surface 104. In other embodiments, the substrate 102 may, however, include, for example and without limitation, optical crown glass, plastic, trivex, polycarbonate and high-index glasses, high index plastics, polymethyl methacrylate, rigid glass permeable and hydrogel lenses.

At least one patterned layer 107 may be formed on the outer surface 104 of the substrate 102 by deposition of at least one patterned coating material 106 on the outer surface 104. The at least one patterned layer 107 which is formed by the at least one patterned coating material 106 forms a pattern that is visible on the outer surface 104 but not visible through the inner surface 108. In some embodiments, the at least one patterned layer 107 may include at least one thin film. In some embodiments, multiple patterned layers, such as a first patterned layer 107 and a second patterned layer 113 (FIG. 1F), for example and without limitation, can be sequentially formed on the outer surface 104 by sequential deposition of the first patterned coating material 106 and at least a second patterned coating material 112.

The at least one patterned coating material 106 may be applied to the outer surface 104 of the substrate 102 through a variety of processes known in the art including, for example and without limitation, vacuum deposition. In some embodiments, one or more sequential applications of the at least one patterned coating material 106 can be made on one or more surfaces of the substrate 102 using a physical vapor deposition procedure. In other embodiments, any variety of etching, engraving, adjusting of index refractions and/or polymerization may be carried out to apply the patterned coating material 106 on the outer surface 104. Nonetheless, suitable vacuum depositions for coating the outer surface 104 with the at least one patterned coating material 106 may include, for example and without limitation, physical vapor deposition, cathodic arc deposition, electron beam physical vapor deposition, and sputter deposition.

The patterned coating material 106 forms at least one patterned layer 107 having a selected pattern. The pattern in the at least one patterned layer 107 may include a decorative pattern, logo, image or text, for example and without limitation. The non-limiting example in FIG. 1C illustrates a school logo. The patterns could further include anything from a letter, a name or a star to more complex patterns such as camouflage. The patterned articles 100 and methods 400 for coating substrates 102 with a patterned layer described herein could also are applied to windows, displays, plastics, glass or any other substrates 102 or methodology needed or wanted to create a pattern. In the non-limiting example illustrated in FIG. 1B, the substrate 102 is a lens for sunglasses.

Figure 1G:
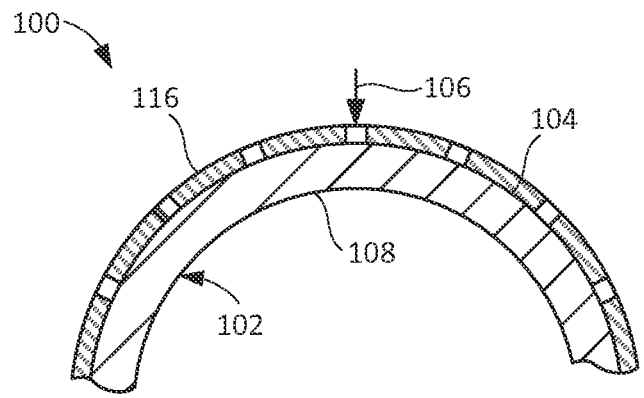
FIG. 1G is a cross-sectional view of a section of a substrate, illustrating placement of a deposition mask on the outer surface of the substrate and application of a patterned coating material through mask openings in the deposition mask to form a patterned layer having patterned openings on the outer surface of the substrate in fabrication of a patterned article in accordance with an illustrative embodiment of the present invention.
Figure 1H:
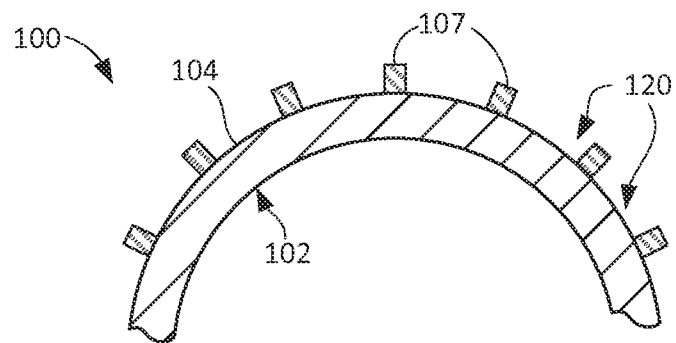
FIG. 1H is a cross-sectional view of a section of a substrate, with the patterned layer having patterned openings formed on the outer surface of the substrate as a result of the process illustrated in FIG. 1G in accordance with an illustrative embodiment of the present invention.

A non-limiting example of a technique which is suitable for forming the at least one patterned layer 107 on the outer surface 104 of the substrate 102 is illustrated in FIGS. 1G and 1H. As illustrated in FIG. 1G, a deposition mask 116 may initially be positioned on the outer surface 104 of the substrate 102. The deposition mask 116 may have mask openings 118 which are arranged in the desired pattern corresponding to the pattern of the at least one patterned layer 107 that is to be applied to the outer surface 104. The patterned coating material 106 may be deposited onto the outer surface 104 through the mask openings 118 as the solid portions of the deposition mask 116 shield the covered portions of the outer surface 104 from the patterned coating material 106. As illustrated in FIG. 1H, the deposition mask 116 may next be removed from the outer surface 104 such that the at least one patterned layer 107 has patterned openings 120 corresponding to the areas of the outer surface 104 which were shielded by the deposition mask 116. Alternative techniques known by those skilled in the art may be used to differentially apply the patterned coating material 106 to the outer surface 104 to form the at least one patterned layer 107 having the desired pattern.

Figure 2:
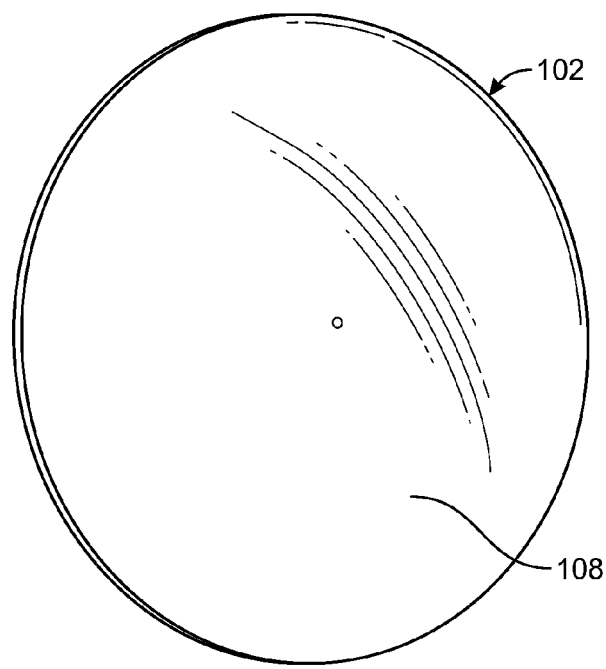
FIG. 2 is a detailed perspective view of an inner surface of an exemplary patterned article in accordance with an illustrative embodiment of the present invention.

As illustrated in FIG. 2, the substrate 102 may have the inner surface 108 opposite the outer surface 104. The patterned coating material 106 is not applied to the inner surface 108 to form the patterned layer 107. In some embodiments, the inner surface 108 may be concave. In other embodiments, the inner surface 108 may be generally planar or convex. The inner surface 108 may provide a substantially unrestricted view through the substrate 102, with or without the at least one patterned layer 107 having been applied to the outer surface 104. In this manner, the patterned layer 107 is visible only on the outer surface 104. The optical properties 110 of the at least one patterned layer 107 substantially match the optical properties 110 of the substrate 102 and/or the optical properties 110 of any optical coating (not illustrated) which may be integrated into the substrate 102. The patterned articles and methods of the disclosure may therefore facilitate substantially unrestricted viewing of objects through the substrate 102 from the vantage point of the inner surface 108, without visibility of the at least one patterned layer 107.

It is known in the art that substrates can have different optical properties which depend on thickness, reflectiveness, chemical composition and intended use. The optical properties 110 of the substrate 102 may include, for example and without limitation, reflectiveness, refraction, absorption, photochromatic properties, and light scattering properties. Additionally, additional optical coatings (not illustrated) can be incorporated into the substrate 102 for enhancing the physical and optical characteristics of the substrate 102. The optical coatings may include, for example and without limitation, tints, scratch resistant coating and anti-reflective coating. For the present invention, at least one optical property 110 of the at least one patterned coating material 106 must at least partially match at least one optical property 110 of the substrate 102 and/or at least one optical property 110 of any optical coating which may be integrated into the substrate 102. The at least one optical property 110 of the substrate 102 and/or the at least one optical property 110 of the optical coating which is integrated into the substrate 102 dictates the type of patterned coating material 106 that will therefore be used.

Figure 3A:
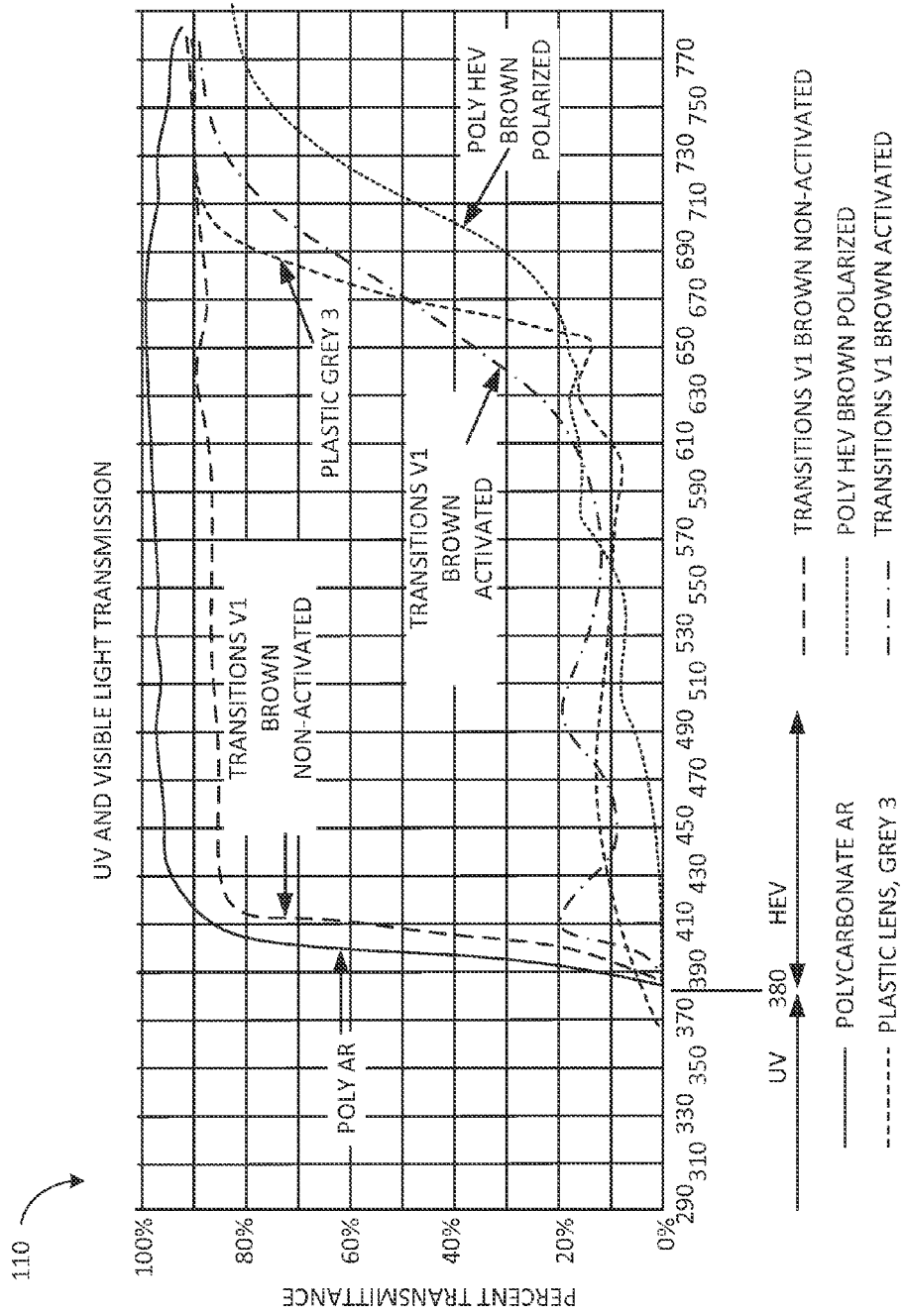
FIG. 3A is an optical properties chart which illustrates transmission of light through patterned articles having variously tinted substrates coated with at least one patterned layer in accordance with an illustrative embodiment of the present invention.
Figure 3B:
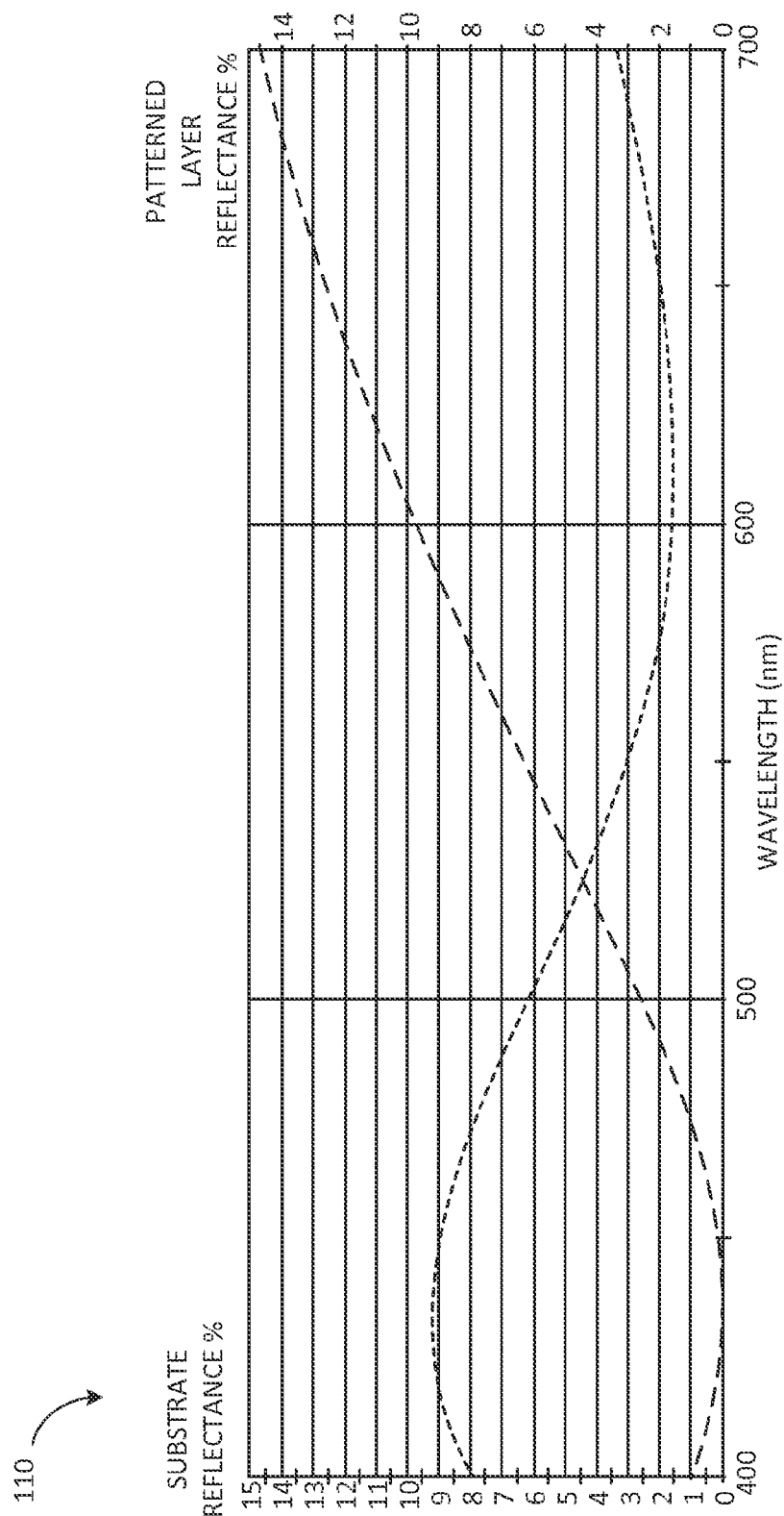
FIG. 3B is an optical properties chart which illustrates diverging reflectance percentages between a substrate and at least one patterned coating layer on the substrate of a patterned article in accordance with an illustrative embodiment of the present invention.
Figure 3C:
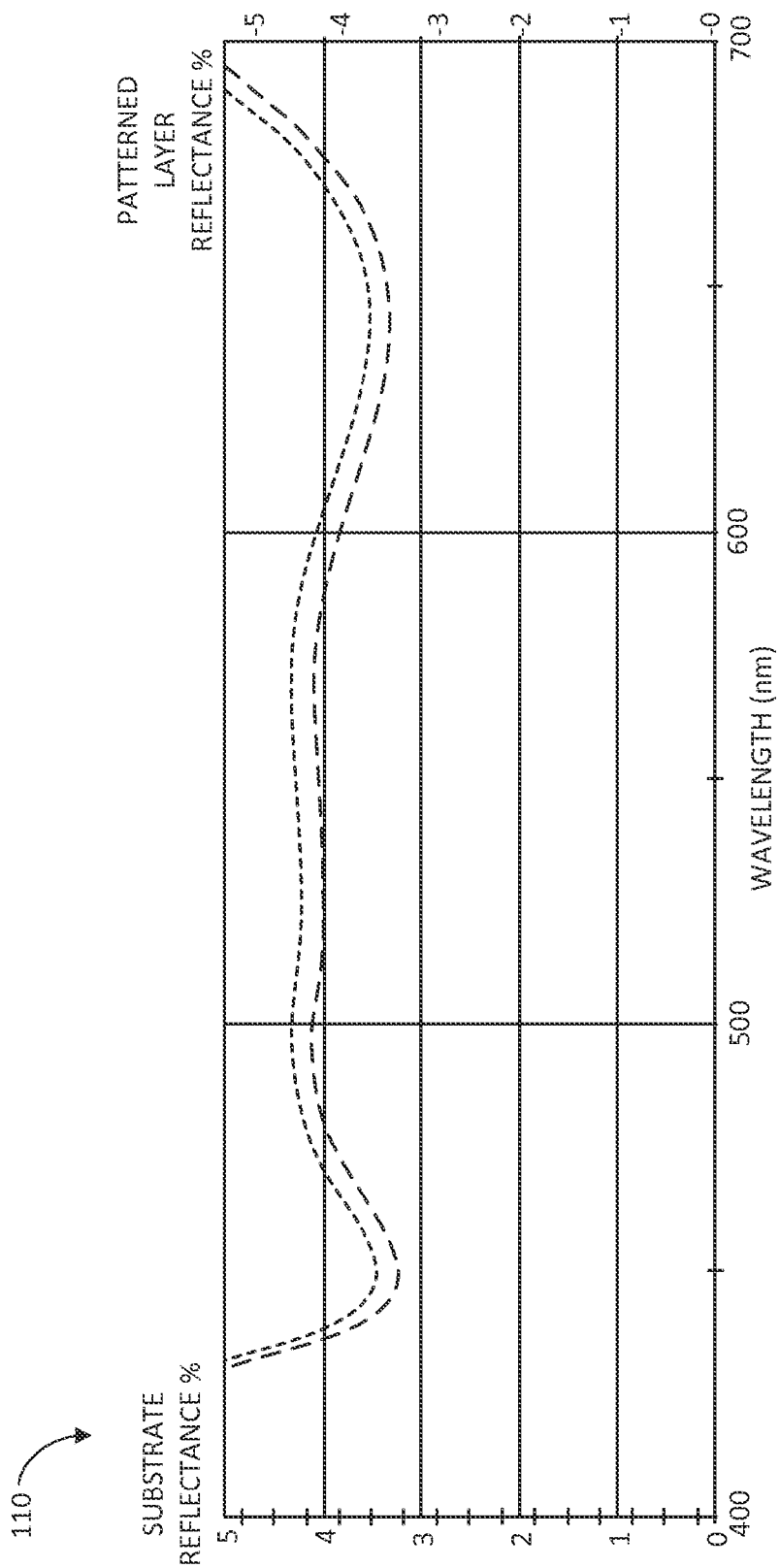
FIG. 3C is an optical properties chart which illustrates converging reflectance percentages between a substrate and at least one patterned coating layer on the substrate of a patterned article in accordance with an illustrative embodiment of the present invention.

As referenced in FIGS. 3A, 3B and 3C, as noted above, the design and application of the at least one patterned coating material 106 is dependent on the optical properties 110 of the substrate 102 and any optical coatings integrated onto or into the substrate 102. The patterned coating material 106 must have similar optical properties 110 and align accordingly with the optical properties 110 of the substrate 102 and of the optical coatings on the substrate 102. Otherwise, the patterned coating material 106 may produce undesirable effects such as visibility through the inner surface 108, back reflections on the inner surface 108 or an outer surface 104 with altered patterns. As illustrated in FIG. 3A, the percentage transmission of the light through the substrate 102 is dependent on the optical property 110 of tint and polarization for the substrate 102.

Additionally, when more than one patterned layer 107 is coated on the outer surface 104 of the substrate 102, the optical properties 110 of each patterned layer 107 must be similar to and align with each other. For instance, a patterned layer 107 that is too thick may produce a shadowing effect on the pattern from the outer surface 104 and may restrict visibility through the inner surface 108. A misaligned patterned layer 107 may excessively block transmission of light through the substrate 102.

FIG. 3B shows a divergence between a substrate reflectance percentage and a patterned layer reflectance percentage, which may cause the patterned layer 107 to be visible from the inner surface 108. Conversely, FIG. 3C shows the more desirable convergence between the reflectance percentage of the substrate 102 and the reflectance percentage of the patterned layer 107, which convergence may cause the pattern in the patterned layer 107 to be visible only from the outer surface 104.

In one non-limiting example of the optical property 110 of the substrate 102 substantially matching the optical property 110 of the patterned layer 107, a camouflage pattern similar to hunter's clothing may be utilized to coat a brown polarized lens as the substrate 102. The at least one optical property 110 of the lens may first be analyzed to correlate with the at least one optical property 110 of the camouflage pattern. Once the optical properties 110 of the lens are understood, the camouflage pattern can be created with the desired optical properties 110 to impart a desired outer surface reflection color and pattern while substantially eliminating the visible presence of the camouflage pattern through the inner surface 108.

In another non-limiting example, a camouflage pattern with two different colors may be chosen. For example and without limitation, brown and green colors may be chosen as the desired colors to be presented on a brown polarized lens. The brown polarized lens absorbs some color spectra and transmits other color spectra. Knowing the optical properties of the lens, a pattern designer can create a series of coatings that yield the brown and green colors necessary for visibility of the camouflage pattern from the outer surface 104. Additionally, the pattern designer can create a back reflection in the patterned coating material 106 that closely matches the absorption characteristics of the brown polarized lens to restrict visibility of the pattern through the inner surface 108.

As an important part of the coating process, a pattern designer can create the pattern of the patterned layer 107 so that each pattern's reflection, back reflection, absorption and transmission are understood. The patterns of the patterned layer 107 must be similar in their optical properties 110, such as their reflection and absorption characteristics, to the lens. A significant divergence in optical properties 110 may yield the undesirable effect of the patterned layer 107 being visible through the inner surface 108. Additionally, the optical properties 110 of each subsequently-deposited second and following patterned layer 113 must be understood in relation to the optical properties 110 of the prior patterned layer 107 as well. Accordingly, when the first patterned layer 107 and at least the second patterned layer 113 are sequentially applied to the outer surface 104 of the substrate 102, the back reflection of the first patterned layer 107 and the second patterned layer 113 cannot be seen through the inner surface 108.

Figure 4:
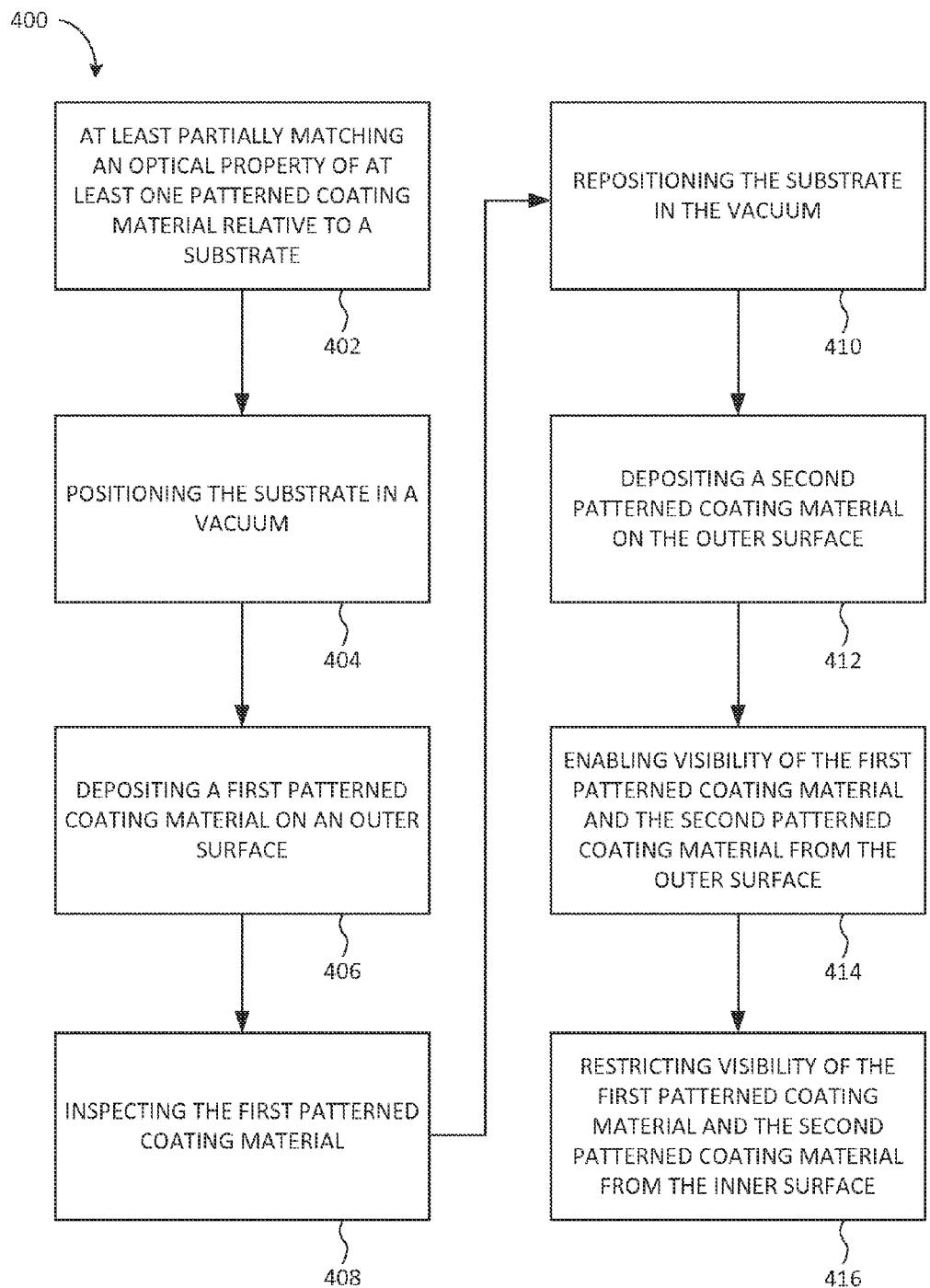
FIG. 4 is a flow diagram of an exemplary method for coating a substrate with a patterned layer in formation of a patterned article in accordance with an illustrative embodiment of the present invention.

FIG. 4 illustrates a flow diagram of an exemplary method 400 for fabricating a patterned article 100 by coating a substrate 102 with at least one patterned layer 107. The method 400 enables a formed pattern in the at least one patterned layer 107 to be visible on the outer surface 104 and substantially invisible through the inner surface 108 while maintaining substantial transparency of the patterned article 100 through the inner surface 108. To achieve this selective visibility of the pattern, the optical properties 110 of the substrate 102 must be substantially matched with the optical properties 110 of the at least one patterned layer 107 to form a compatible match.

In some embodiments, the method 400 may include an initial Step 402 of at least partially matching at least one optical property 110 of at least one patterned coating material 106 which will form at least one patterned layer 107 relative to the optical property 110 of a substrate 102. The optical properties 110 of the substrate 102 may include reflectiveness, refraction, absorption, photochromatic properties and light scattering properties. Additionally, optical coatings may be incorporated or integrated into the substrate 102 for enhancing the functionality of the substrate 102. Such optical coatings may include tinted coatings, scratch-resistant coatings and anti-reflective coatings, for example and without limitation. The optical properties 110 of the substrate 102 and of the optical coatings dictate the type of patterned coating material 106 which is applied to the outer surface 104 of the substrate 102 to form the at least one patterned layer 107.

The method 400 may further include a Step 404 of positioning the substrate 102 in a vacuum. For example and without limitation, in some embodiments, a physical vapor deposition procedure may be carried out to apply at least one patterned coating material 106 on the outer surface 104 of the substrate 102. A Step 406 may include depositing a first patterned coating material 106 to form a first patterned layer 107 on the outer surface 104. The first patterned layer 107 may include at least one of a design, a graphic, a logo and an image.

In some embodiments, a Step 408 may include inspecting the first patterned layer 107. The outer surface 104 of the substrate 102 may be inspected to verify that the first patterned layer 107 is visible and properly deposited. The inner surface 108 of the substrate 102 may be inspected to ensure that the first patterned layer 107 is not visible from that vantage.

A Step 410 may include repositioning the substrate 102 in the vacuum. The repositioning step may facilitate deposition of additional patterned layers 107 to the substrate 102. In some embodiments, a Step 412 may include depositing a second patterned coating material 112 (FIG. 1E) to form a second patterned layer 113 on the first patterned layer 107. The optical properties 110 of the second patterned coating material 112 must substantially match the optical properties 110 of the substrate 102 and the optical properties 110 of the first patterned coating material 106.

As a result of the first patterned coating material 106 and the second patterned coating material 112 having at least one optical property 110 which substantially matches at least one optical property 110 of the substrate 102 and of each other, visibility of the first patterned layer 107 and the second patterned layer 113 on the outer surface 104 and is enabled in Step 414. The outer surface 104 may form the external surface which is most visible during operation of the patterned article 100. In some embodiments, the first patterned layer 107 and the second patterned layer 113 may form a logo pattern on an outer surface 104 of glasses.

Further as a result of the first patterned coating material 106 and the second patterned coating material 112 having at least one optical property 110 which substantially matches at least one optical property 110 of the substrate 102 and of each other, invisibility of the first patterned layer 107 and the second patterned layer 113 through the inner surface 108 may be enabled in a final Step 416. The first and second patterned coating materials must have similar optical properties 110 and align accordingly with the optical properties 110 and optical coatings on the substrate 102. Otherwise, the pattern in the first patterned layer 107 and the second patterned layer 113 may produce undesirable affects such as visibility through the inner surface 108, back reflections on the inner surface 108 or an outer surface 104 with altered patterns.

These and other advantages of the invention will be further understood and appreciated by those skilled in the art by reference to the following written specification, claims and appended drawings.

Because many modifications, variations and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

While the illustrative embodiments of the disclosure have been described above, it will be recognized and understood that various modifications can be made in the disclosure and the appended claims are intended to cover all such modifications which may fall within the spirit and scope of the disclosure.

What is claimed is:
1. A patterned article, comprising:
a tinted substrate absorbing a portion of light and transmitting a portion of light, the transparent substrate having at least one optical property, the at least one optical property including substrate absorption percentage, the substrate further having an outer surface and an inner surface; and
at least a first patterned layer on the outer surface of the substrate and a second patterned layer on the first patterned layer, the first patterned layer visible on the outer surface and having a first color and at least one optical property including patterned layer reflectance percentage substantially matching the at least one optical property including substrate absorption percentage of the substrate, such that the at least one optical property including patterned layer reflectance percentage of the at least one patterned layer and the at least one optical property including substrate absorption percentage of the substrate work together to achieve visibility of the at least one patterned layer from the outer surface of the substrate while at least partially restricting visibility of the at least one patterned layer through the inner surface whereby reflection in the patterned layer matches the absorption characteristics of the tinted substrate to restrict visibility of the patterned layer through the inner surface; and the second patterned layer on the first patterned layer having a second color, the second color of the second patterned layer contrasts against the first color of the first patterned layer.

2. The patterned article of claim 1 wherein the substrate comprises a lens for glasses.

3. The patterned article of claim 1 wherein the first patterned layer comprises at least one thin film.

4. The patterned article of claim 1 wherein the tinted substrate is polarized.

5. The patterned article of claim 1 wherein the outer surface is generally convex and the inner surface is generally concave.

6. The patterned article of claim 1 wherein the outer surface is generally planar.

7. The patterned article of claim 1 wherein the at least a first patterned layer and a second patterned layer comprises at least one of a decorative pattern, a logo, an image and text.

8. A patterned article, comprising:
an at least partially transparent substrate having at least one optical property, the at least one optical property including an at least partial substrate absorption percentage, the substrate further having an outer surface and an inner surface;
at least a first patterned layer on the outer surface of the substrate and a second patterned layer on the first patterned layer, the first patterned layer having a first color and the second patterned layer having a second color;
the first patterned layer and the second patterned layer visible on the outer surface and each having at least one optical property including patterned layer reflectance percentage substantially matching the at least one optical property including substrate absorption percentage of the substrate, such that the at least one optical property including patterned layer reflectance percentage of the at least one patterned layer and the at least one optical property including substrate absorption percentage of the substrate work together to achieve visibility of the at least one patterned layer from the outer surface of the substrate while at least partially restricting visibility of the at least one patterned layer through the inner surface whereby reflection in the patterned layer matches the absorption characteristics of the substrate to restrict visibility of the patterned layer through the inner surface; and
the second color of the second patterned layer contrasts against the first color of the first patterned layer.

9. The patterned article of claim 8 wherein the substrate comprises a lens for glasses.

10. The patterned article of claim 8 wherein the at least a first patterned layer and a second patterned layer comprises at least one thin film.

11. The patterned article of claim 8 wherein the substrate is tinted and polarized.

12. The patterned article of claim 8 wherein the outer surface is generally convex and the inner surface is generally concave.

13. The patterned article of claim 8 wherein the outer surface is generally planar.

14. The patterned article of claim 8 wherein the at least a first patterned layer and a second patterned layer comprises at least one of a decorative pattern, a logo, an image and text.

15. A method for coating a substrate with at least one patterned coating material, the method comprising:
at least partially matching at least one optical property including patterned layer reflectance percentage of at least one patterned substantially transparent substrate coating material with at least one optical property including substrate absorption percentage of a substantially transparent substrate having an outer surface and an inner surface;
forming at least one of a first patterned layer and a second patterned layer on the outer surface of the substrate by depositing the at least one patterned coating material on the outer surface, the first patterned layer having a first color and the second patterned layer having a second color, whereby the at least one optical property including patterned layer reflectance percentage of the at least one patterned coating material and the at least one optical property including substrate absorption percentage of the substrate work together to achieve visibility of the at least one patterned layer from the outer surface of the substrate while at least partially restricting visibility of the at least one patterned layer through the inner surface; and forming an optical coating integrated into the substrate for enhancing the physical and optical characteristics of the substrate, the optical coating having a property selected from the group consisting of a tint, a scratch resistant coating, a polarized coating, and an anti-reflective coating and the second color of the second patterned layer contrasts against the first color of the first patterned layer.

16. The method of claim 15 further comprising inspecting the first patterned layer.

17. The method of claim 15 wherein forming at least one of a first patterned layer and a second patterned layer on the outer surface of the substrate comprises forming the first patterned layer on the outer surface of the substrate by depositing a first patterned coating material on the outer surface of the substrate and forming the second patterned layer on the first patterned layer by depositing a second patterned coating material on the first patterned layer.

18. The method of claim 15 wherein the substrate comprises a lens for glasses.

19. The method of claim 15 wherein the at least one patterned coating material comprises at least one thin film.

20. The method of claim 15 wherein the at least one of a first patterned layer and a second patterned layer comprises at least one of a decorative pattern, a logo, an image and text.

* * * * *